United States Patent
Blount

(10) Patent No.: US 8,986,437 B2
(45) Date of Patent: Mar. 24, 2015

(54) DELIGNIFICATION OF BIOMASS CONTAINING LIGNIN AND PRODUCTION OF ADHESIVE AND METHODS OF MAKING LIGNIN CELLULOSE COMPOSITIONS

(76) Inventor: David H. Blount, San Diego, CA (US)

( * ) Notice: Subject to any disclaimer, the term of this patent is extended or adjusted under 35 U.S.C. 154(b) by 384 days.

(21) Appl. No.: 13/385,150

(22) Filed: Feb. 6, 2012

(65) Prior Publication Data

US 2013/0202905 A1 Aug. 8, 2013

Related U.S. Application Data

(63) Continuation-in-part of application No. 12/658,429, filed on Feb. 12, 2010, now Pat. No. 8,409,403, which is a continuation-in-part of application No. 12/589,399, filed on Oct. 23, 2009, now Pat. No. 8,268,121.

(51) Int. Cl.
  *C08L 97/02* (2006.01)
  *C09D 197/02* (2006.01)
  *C08L 97/00* (2006.01)

(52) U.S. Cl.
  CPC ............... *C08L 97/02* (2013.01); *C08L 97/005* (2013.01)

USPC ................ 106/137.1; 106/123.12; 106/126.2; 106/137.6

(58) Field of Classification Search
  CPC ... C08L 97/02; C08L 97/005; C08L 3666/36; C09D 197/02; C09D 197/005; C09D 2489/00; C09D 2497/00
  USPC .................... 106/123.12, 137.6, 126.2, 137.1
  See application file for complete search history.

(56) References Cited

U.S. PATENT DOCUMENTS

| 3,097,177 | A  | * | 7/1963  | Emerson  | 524/499 |
| 3,994,850 | A  | * | 11/1976 | Willegger et al. | 524/799 |
| 7,722,712 | B2 | * | 5/2010  | Li  | 106/126.2 |
| 2008/0021187 | A1 | * | 1/2008  | Wescott et al. | 527/301 |
| 2013/0065012 | A1 | * | 3/2013  | Parker et al. | 428/106 |

* cited by examiner

*Primary Examiner* — David M Brunsman

(57) ABSTRACT

Delignification of biomass consisting of plants containing lignin is done by utilizing an amino compound in an aqueous solution or emulsion to produce water soluble amino lignin and non-soluble amino lignin cellulose which are utilized to produce adhesives and resins for use to produce wood composites and carbohydrate production.

7 Claims, No Drawings

DELIGNIFICATION OF BIOMASS CONTAINING LIGNIN AND PRODUCTION OF ADHESIVE AND METHODS OF MAKING LIGNIN CELLULOSE COMPOSITIONS

PRIORITY CLAIM

This application claims priority to U.S. Provisional Application 12/589,399 filed 10/23/2009 and continuation in part of U.S. patent application Ser. No. 12/658,429, filed Feb. 12, 2010.

Application Ser. No. 13/385,150 is a continuation-in-part of application Ser. No. 12/658,429 now Pat. No. 8,409,403 which is a continuation-in-part of application Ser. No. 12/589,399 now Pat. No. 8,268,121. Application Ser. No. 12/589,399 utilizes amino compounds, plants containing lignin and plants which also containing carbohydrates and plaint proteins such as oleander, caster beans, wheat, cotton, rice, soybean and found in component B, example 8 and claims 7, which is reacted with aldehydes to produce adhesives and resins. Application Ser. No. 12/658,429 utilizes amino compounds, plants containing lignin and plants containing plant proteins and/or carbohydrate and plant protein flour (listed in Component A and on page 5, lines 16-22 of the patent and in the original claim 1) to produce adhesives or reacted with chemical active organic compounds to produce adhesives, resins or organic compounds. Application Ser. No. 13/385,150 utilizes amino compounds, plants containing lignin, lignin, plant containing plant proteins and/or carbohydrates and plant proteins.

FIELD

The invention concerns reacting renewable plant material contain protein and/or carbohydrates, amino compound and lignin cellulose to produce adhesives and lignin cellulose composite when mixed and heated under pressure. The amino compound, utilized in an aqueous solution to break the lignin cellulose bond and react the amino compound with the lignin and with the lignin attached to the cellulose to produce amino lignin and amino lignin cellulose and hemi-cellulose. An amino compound is mixed with a lignin containing plants in water at ambient temperature or heated will partially remove the lignin from the lignin cellulose. The aqueous solution containing preferred amino compound that will break the lignin cellulose bond and react with lignin, such as urea, melamine and guanidine compounds to produce amino lignin and amino lignin cellulose is mixed with plant protein and/or carbohydrates to produce an adhesive emulsion. The lignin containing plant is placed in an amino water solution for 12-24 hours or is heated under pressure up to 150 degree C. to remove most of the lignin from the lignin containing plant material and the cellulose and hemi-cellulose may be converted to carbohydrates. The lignin containing plant material, amino compound and plant protein and/or carbohydrates may be reacted when mixed in a solid particle form then reacted under moist heat and pressure to form an adhesive lignin cellluloscis composition.

The lignin reacts with the amino compounds to form amino lignin which is soluble in water and the amino compounds reacts with lignin that is still attached to the cellulose to produce amino lignin cellulose. The water containing the amino lignin is filtered from the amino lignin cellulose. The water in the aqueous solution of amino lignin is evaporated to remove most of the water to form a thick solution. The aqueous solution of amino lignin is then reacted with plant material containing protein and/or carbohydrates to produce and aqueous adhesive. This aqueous adhesive when applied between two layers of wood boards, then after drying it glues the two pieces of wood together. This aqueous adhesion may be rapidly cured by applying heat and pressure. The amino lignin cellulose may be modified by use of a basic or acidic catalyst to separate the amino lignin from the cellulose. The amino lignin reacted with a plant protein and/or carbohydrate is utilized as an adhesive to produce composites and molded product.

After the amino compound has reacted with the delignication of the lignin and with the lignin attached to the cellulose a basic catalyst, sodium hydroxide, is added to the aqueous solution and heated to separate the amino lignin from the amino lignin cellulose thereby producing sodium amino lignin, lignin cellulose and cellulose. The aqueous solution of amino lignin and sodium amino lignin is then reacted with a plant protein and/carbohydrate to produce an aqueous adhesive. The amino lignin maybe first filtered of f then the sodium hydroxide is added to an aqueous emulsion heated to produce sodium amino lignin and lignin cellulose and is reacted with a plant protein and/or a carbohydrate to produce an adhesive emulsion.

The amino lignin cellulose and lignin cellulose with most of the lignin removed may be hydrolyzed with concentrated acid, cellulase or microbe enzymes to produce carbohydrates or by cellulase enzymes, steam explosion and micoorganisms enzymes.

BACKGROUND

The use of urea aldehyde resins containing lignin sulfonate is well know in the Art but the use of amino compounds such as urea, guanidine, cyanoguanidine, aminoguanidine, guanidine carbonates and mixtures thereof for delignification of lignin from biomass consisting of lignin containing plants and at the same time reacting the amino compound with lignin and with lignin still attached to the cellulose is novel before reacting the amino compound with a plant protein and/or carbohydrate. There are many US and Foreign Patents which utilized urea formaldehyde resin containing lignin sulfonate and other extracted lignin but no articles or patents were found that produces amino lignin in the process of delignification of biomass containing lignin. U.S. Pat. No. 2,366,265 of Reiche et al. and U.S. Pat. No. 2,622,979 of Keim extends the urea formaldehyde resin by the addition of lignin-sulfonate. U.S. Pat. No. 3,994,860 of Willegger and Thiel adds the lignin sulfonate to the formaldehyde and urea to produce a resin. The use of aminoplasts as an adhesive and resin is well known in the art but an aqueous solution of the aminoplasts such as urea formaldehyde resin does not have any properties to break the lignin cellulose bond. Unlike the prior art processes of these representative patents, in accordance with this invention most of the lignin and cellulose bonds are broken by the amino compound and the amino reacts with the lignin to produce an amino lignin and amino lignin cellulose and releases the hemi-cellulose.

The adhesive composition may also include additives and fillers found in lignocellulosic adhesives such as bactericide, insecticides, silica, wheat flour, tree bark flour, lignin cellulose, nut shell flour and the like.

The adhesive compositions are heat-curable but may be cured at ambient temperature and pressure. Curing typically occurs during the hot pressing step of the lignocellulosic composite formation. Thus, the cure temperature of the adhesive composition is tailored so that it coincides with the heating temperatures used in composite formation. Such cure temperatures may range, for example, from about 100 to about 200 degree. C., more particularly from about 120 to about 225.degree C.

The adhesive components will react together when in a non-aqueous solution by mixing the amino compound, biomass containing lignin in a moist condition and plant protein and/or carbohydrate when under heat and pressure to produce hard and strong lignocellulosic composites Lignocellulosic composites that can be produced with the adhesives described herein include particleboard, oriented strand board (OSB), wafer board, fiberboard (including medium-density and high-density fiberboard), parallel strand lumber (PSL), laminated strand lumber (LSL), and similar products. In general, these composites are made by first blending comminuted lignocellulosic materials with an adhesive that serves as a binder that adheres the comminuted lignocellulosic materials into a unitary densified mass. Examples of suitable lignocellulosic materials include wood, straw (including rice, wheat and barley), flax, hemp and bagasse. The comminuted lignocellulosic materials can be in any processed form such as chips, flakes, fibers, strands, wafers, trim, shavings, sawdust, straw, stalks and shivs. The resultant mixture is formed into the desired configuration such as a mat, and then processed, usually under pressure and with heat, into the final product. Processes are generally carried out at temperatures of from about 120 to 225 degree C. in the presence of varying amounts of steam, generated by liberation of entrained moisture from the lignocellulosic materials. Thus, the moisture content of the lignocellulose material may be between about 2 and about 20 percent by weight, before it is blended with the adhesive.

The amount of adhesive mixed with the lignocellulosic particles may vary depending, for example, upon the desired composite type, lignocellulosic material type and amount of, and particular type of, adhesive composition. In general, about 1 to about 12, more particularly about 3 to about 10, weight percent adhesive may be mixed with the lignocellulosic material, based on the total combined weight of adhesive and lignocellulosic material. The mixed adhesive composition may be added to the comminuted lignocellulosic particles by spraying or similar techniques while the lignocellulosic particles are tumbled or agitated in a blender or similar mixer. For example, a stream of the comminuted lignocellulosic particles may be intermixed with a stream of the mixed adhesive composition and then be subjected to mechanical agitation.

The adhesive compositions also may be used to produce plywood, hardboard or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesive provides a strong bond between the lignocellulosic particles or fractions. The adhesive also provides structural composites with high mechanical strength. In addition, the adhesive composition is substantially free of formaldehyde (including any compounds that may degenerate to form formaldehyde). For example, the adhesive compositions do not contain any formaldehyde (and formaldehyde-generating compounds) that is detectable by conventional methods or, alternatively, the amount of formaldehyde (and formaldehyde-generating compounds) is negligible from an environmental and workplace regulatory standpoint.

SUMMARY

In one aspect, the invention comprises the delignification of biomass consisting of lignin containing plants by an amino compound such as urea, melamine and/or guanidine compounds in an aqueous solution thereby producing hemi-cellulose, amino lignin and amino lignin cellulose which are reacted with plant material containing a protein and/or carbohydrate.

Another aspect of the invention is a method to react the amino compound with the lignin to form an aqueous amino lignin solution which is then filtered from the amino lignin cellulose.

Another aspect of the invention is a process to react the amino lignin with a plant material containing a protein and/or carbohydrate to produce an adhesive comprising serially contacting:

(A) amino compound that will break the lignin cellulose bond and react with the lignin;
(B) biomass comprising of lignin containing plant;
(C) water or water contained in the plant materials;
(D) plant containing protein and/or carbohydrate;
under conditions sufficient to break the lignin cellulose bond and react the lignin with amino compound to produce water soluble amino lignin, and non-water soluble amino lignin cellulose then react the amino lignin and amino lignin cellulose with a plant protein and/or carbohydrate.

Another aspect of the invention is to add and react a basic compound such as sodium hydroxide to the aqueous mixture of amino lignin and amino lignin cellulose to produce water soluble sodium amino lignin, lignin cellulose with only a small amount of lignin and cellulose.

Another aspect of the invention is to add the sodium hydroxide after the aqueous amino lignin has been filter off thereby producing an aqueous solution of sodium amino lignin, lignin cellulose with only a small amount of lignin and cellulose.

Another aspect of the invention is to react the amino lignin and sodium amino lignin with a plant protein and/carbohydrate to produce an adhesive composition.

Another aspect of the invention is a method to produce an amino lignin protein and/or carbohydrate adhesive by reacting the amino lignin with and protein and/or carbohydrate.

Another aspect of the invention is to react the amino lignin and the amino lignin cellulose with a plant protein and/or carbohydrate and apply it between layers of lignin cellulocis materials to produce a rigid, hard, thermosetting panel or other products.

Another aspect of the invention is to mix the amino compound, plant protein and/or carbohydrate and biomass containing lignin then compress and heat to react and cure the adhesive composition.

Another aspect of the invention is to hydrolyze the amino lignin cellulose and lignin cellulose containing a small amount of lignin with concentrated acids such as sulfuric acid and hydrochloric acid or by cellulase enzymes or microorganism enzymes to produce carbohydrates then sugars are fermented to produce alcohol.

Component A

Amino Compounds comprising of urea, melamine, biuret, guanidine, aminoguanidine, guanidine carbonate, cyanoguanidine and mixtures thereof are utilized to break the lignin cellulose bond and amino compounds are react with the lignin and with the lignin attach to the cellulose but has free acid radicals. The amino compounds may be in the form of a powder, crystals or a solid. Any suitable amino compound may be utilized with the urea and/or guanidine compounds to react with the lignin such as melamine, dicyandiamide, melamine cyanurate, thiourea, methyl urea, biuret, cyanuric acid, urea condensates such as urea guanidine condensates, urea polyamine condensates, cyamelide, urea-melamine condensates, urea-cyandiamide, urea-aminoguanidine condensate, urea cyanoguanidine condensate, urea cyanurate, aminophosphates with free —NH$_2$ radicals and mixtures thereof. Urea is the preferred amino compound. The amino compounds are utilized in the amount of 25-100 parts by weight.

Component B

Any suitable biomass comprising of lignin containing plant may be used in this invention. Any suitable biomass consisting of lignin-cellulose or cellulose-containing plants or the products of cellulose containing plants which contain lignin and cellulose may be used in this invention. Many different biomass feed stocks utilized in this invention can be used to produce adhesives, fertilizer, resins, plastics or liquid fuel. Some of the common ones comprising agricultural crops, bio-energy crops, such as fast growing trees, agricultural residues, wood residues and waste streams from municipal solid waste cellulose fiber fines, bagasse and waste paper containing lignin. The plant material is preferred to be in the form of small particles such as sawdust, wood chips or ground up biomass. In nature, lignin-cellulose and cellulose are widely distributed. It is found in all plants and they may be used in this process. Suitable cellulose-containing plants include, but are not limited to, trees, e.g., spruce, pine, hemlock, fir, oak, cypress, redwood, cherry, elm chestnut, hickory, locust, sycamore, tulip, tulip, butternut, apple, alder, magnolia, dogwood, catalpa, boxwood. Crabwood, mahogany, greenheart, lancewood, letterwood, mora, prima vera, purpleheart, rosewood, teak, satinwood, mangrove, waffle, orange, lemon, logwood, fustic, osage orange, sappanwood, Brazilwood, barwood, camwood, sandalwood, rubber, gutta, mesquite and shrubs, e.g., oleander, cypress, junipers, acanthus, pyracantha, ligustrum, lantana, bougainvillea, azalea, feijoa, ilex, fuscia, hibiscus, datura, holly, hydrangea, jasmine, eucalyptus, cottoneaster, xylosma, rhododendron, castor gean, eugenia, euonymus, fatshedera, aralia, etc., and agricultural plants e.g., cotton stalks, corn stalks, wheat straw, oat straw, rice straw, cane sugar (bagasse) soybean stalks, peanut plants, pea vines, sugar beat waste, sorghum stalks, tobacco stalks, maize stalks, barley straw, buckwheat straw, quinoa stalks, cassava, potato plants, legume vines and stalks, vegetable inedible portion, etc., weeds, grasses, vines, flowers and mixtures thereof. The waste products of agricultural plants which contain cellulose and lignin may be ground into small particles and used in this invention. Commercial waste products containing lignin and cellulose, e.g., paper, bagasse wallboard, wood products, etc., may be used in this invention. Cellulose-lignin containing plants which have been partially decomposed, such as trees, grass clippings, humus, peat and certain soft brown coal, may be used in this invention.

Other products of cellulose lignin containing plants may be recovered in the process of this invention such as hemi-cellulose, waxes, gums, oils, sugars, wood alcohol agar, rosin, turpentine, resins, rubber latex, dyes, glycerol, etc. Lignin containing plants are utilized in the amount of 200 to 400 parts by weight.

Component C

Any suitable plant containing protein and/or carbohydrates may be utilized in this invention. Plants containing protein also contain carbohydrates. Suitable materials containing protein and/or carbohydrates obtained from a renewable source comprising, but not limited to, plant proteins, keratin, gelatin, collagen, gluten, and casein. The adhesive composition can be made by reacting at least one protein, especially a soy protein, and/or a lignin with at least one adhesion promoter. A mixture of protein and amino lignin may be employed. In a first variant, the protein and/or carbohydrate or amino lignin is reacted with a compound that may provide both curing for the adhesive composition and adhesion to the lignocellulosic substrate. In other words, the compound is a difunctional adhesion promoter in the sense that one compound can provide dual functions. In a second variant, the protein or amino lignin is reacted with two different adhesion promoters. The first adhesion promoter modifies the protein or amino lignin by introducing additional nitrogen-containing functional groups at internal, terminal and/or pendant positions of the protein or amino lignin polymer structure resulting in an amino and/or imino-augmented protein. The second adhesion promoter is a curing agent. Both the first and second variants of the adhesive composition typically are provided as a two-part system in which the protein or amino lignin comprises one part or package and the curing agent (i.e., the difunctional adhesion promoter in the first variant or the distinct curing agent in the second variant) comprises the second part or package. In both the first and second variants, all the parts or components of the composition may be in the form of aqueous solutions or dispersions. Thus, volatile organic solvents as carrier fluids can be avoided.

The protein typically is any protein that is readily available from a renewable source. Examples of such proteins include soy protein, keratin, gelatin, collagen, gluten, and casein. The protein may have been pretreated to obtain a material that is soluble or emulsified in water as is known in the art. Soy protein is an exemplary protein for use in the presently described adhesives. Soybeans contain about 38 weight percent protein with the remaining portion comprising carbohydrates, oils and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. Soy flour includes approximately 50 weight percent protein, soy protein concentrate includes at least about 65 weight percent protein (dry weight), and SPI includes at least about 85 weight percent protein (dry weight). According to certain embodiments of the adhesive composition, the soy protein is SPI. Soy protein is an exemplary protein for use in the presently described adhesives. Soybeans contain about 38 weight percent protein with the remaining portion comprising carbohydrates, oils and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. According to certain embodiments of the adhesive composition, the soy protein is SPI.

The protein may be prepared for use in the adhesive compositions in any manner. Typically, the protein is included in a carrier or delivery liquid such as water or similar solvent. In particular, the protein may be dissolved in water and the resulting aqueous solution mixed with the modifying reactant(s). The aqueous adhesive solution may be prepared, for example, by initially mixing the protein in water and adjusting the pH of the mixture to the desired range. When the protein is mixed with the modifying reactant(s), the pH of the protein part may be acidic or alkaline. For example, the pH of the protein part may be about 5 to about 8 for the reaction of the protein with an amine compound. However, when the modified protein is used as a wood adhesive, the pH value should be between about 4.5 to about 11. The pH may be adjusted by adding basic substances such as, for example, alkali hydroxides, or by adding acidic substances such as inorganic acids or organic acids. The amount of protein dissolved in the water may be adjusted to provide the desired solids content for the adhesive composition. The protein solids content may be, for example, from about 10 to about 60 weight percent. The protein solution may be freeze-dried at this stage of formulation or it may remain as a liquid solution. If the protein solution is freeze-dried, water (or the appropriate carrier fluid) is simply added to the freeze-dried substance prior to use. Freeze-drying will reduce the cost of transporting the adhesive.

There are a number of synthesis variations for modifying the protein to increase the number of phenolic hydroxyl groups, amino or imino functional groups, and/or thiol functional groups. In a first variant, the protein may be reacted with a multi functional compound that includes (i) a first functional group selected from a phenolic hydroxyl, a thiol, or an amino and (ii) a second functional group that can form a covalent bond with the protein. The second functional group may be an amino, carboxyl, hydroxyl, or similar protein-reactive group. In examples of the first variant, the protein may be reacted with a multi functional compound that includes both phenolic hydroxyl and amino functional groups (or both thiol and amino functional groups) that can be introduced into the protein structure. The amino functional groups react with the carboxyl functional groups of the protein to form amide linking groups. In a second variant, the protein may be initially reacted with a nitrogen-donating compound for producing an amine-augmented protein that is subsequently reacted with a phenolic hydroxyl-donating compound for producing the final modified protein adhesive. In a third variant, the protein may be initially reacted with a phenolic hydroxyl-donating compound for producing a phenolic hydroxyl-augmented protein that is subsequently reacted with a thiol- or nitrogen-donating compound for producing the final modified protein adhesive. In all of the variants, all of the reactants may be in the form of aqueous solutions or dispersions. Thus, volatile organic solvents as carrier fluids can be avoided.

Carbohydrates such as starch, corn flours, rice, lupines, lucerne, pea, rapeseed, oats, amaranth, inca inchi or quinoa, the obtaining of starch being the focus with some of these plants. Soy beans contain both protein and carbohydrate. Most eatables plants contain carbohydrates.

Component D

Water is utilized to make and aqueous solution of the amino compounds and also to wash out the water soluble components such as amino lignin from the amino lignin cellulose in the amount of 1-500 parts by weight. The plants containing lignin may contain enough water so that water does not need to be added or water added in the form of steam heat.

Component E

Acetic or basic catalyst may be added to modify the reaction of the amino lignin and/or amino lignin cellulose with proteins and/or carbohydrates to produce thermoplastic or thermosetting resin. Suitable basic compounds include but not limited to, compounds containing alkali metal, alkaline earth metal and ammonia radicals, amines and mixtures thereof. Suitable acidic compounds include, but not limited to, sulfuric acid, hydrogen chloride, nitric acid, halogen acids, acidic compounds containing sulfur, sulphonic acid halides, acidic phosphorus containing compound, carboxylic acids, polycarboxylic acids, citric acids and mixtures thereof. In most reactions basic or acidic catalytic are not necessary. Sulfuric acid and hydrogen chloride may be utilized to convert cellulose into carbohydrates. A catalytic amount is utilized may range from the amount of 0.1 to 100 parts by weight.

Component F

Any suitable compound that will improve the water resistant property of this adhesive composition may be use in this invention such as cross-linking compounds and resins. Suitable compounds include but not limited to boric acid, inorganic salts of boric acid, sodium silicate, non-formaldehyde aldehydes, phenolic hydroxides with 2or more hydroxide groups, amino and phenol non-formaldehyde aldehydes resins, polyepoxy compounds or resins, polyamines, polycarboxylic acids, organic phosphorus compounds and other cross-linking agents in the amount of 0 to 50 parts by weight.

Component G

Any suitable filler may be added to the amino lignin or amino lignin cellulose adhesive composition. They may be inorganic substance, such as, alkali metal silicates, alkaline earth metal silicates, metal silicates, silica, metals and metal oxides, carbohydrates, sulphates, phosphates and borates, glass beads, and mixtures thereof. They may be organic substances such as, amino compounds, wood particles, cellulose, lignin, lignin cellulose, amino salts of organic phosphates, plastics, powdered coke, graphite, graphite compounds, plant particles and mixtures thereof. The filler may be used in the amount of 1 to 300 parts by weight.

Component G

Any suitable method may be used to convert the amino lignin cellulose and remaining lignin cellulose containing less lignin into carbohydrates such as the dilute and/or the concentrated acid hydrolysis methods using sulfuric acid or hydrochloric acid. The concentrated acid utilized in the amount of 2 to 3 parts by weight of acid to 2 parts by weight of amino-lignin-cellulose.

Component H

The amino lignin cellulose and lignin cellulose with most of the lignin removed may be converted to carbohydrates by enzymes such as cellulase and microorganism enzymes.

ILLUSTRATIVE EMBODIMENTS

In general, the lignin cellulose bond is broken by soaking the lignin cellulose in an aqueous solution of the listed amino compounds at ambient temperature for 12 to 24 hours or by heating the biomass containing lignin cellulose plant particles in an aqueous solution of listed amino compounds at ambient pressure at 100 degree C. for 1-4 hours or at 150 degree C. under pressure for 0.5 to 4 hours thereby breaking the lignin cellulose bond and the amino compounds reacts with the lignin to free hemi-cellulose and produce amino lignin and the amino compound react with the lignin still attached to the cellulose to produce amino lignin cellulose. The amino lignin is water soluble and form an aqueous solution of amino lignin. The aqueous amino lignin solution is removed from the amino lignin cellulose by compression, filtration or any suitable means. Water is removed from the aqueous amino lignin solution until a thick solution is formed or further dried until granules are formed. The amino lignin may be utilized to produce amino lignin protein and/or carbohydrates adhesive or resins or may be reacted with epoxy compounds, furfurol or polycarboxyl acids, or polymeric MDI or non-formaldehyde aldehydes to produce resins. The amino lignin cellulose has many uses such as paper production, hydrolyzed to carbohydrates, fiberboard, plywood, molded objects, fertilizer, animal feed and other uses.

The thick aqueous solution of amino lignin is mixed with proteins and/or carbohydrates and reacted thereby producing a thermoplastic or a thermosetting amino lignin protein and/or carbohydrate adhesive or resin.

The amino lignin and amino lignin cellulose mixture with most of the water evaporated off is mixed with a plant protein and/or carbohydrate then heated until the water is evaporated off then further heating the mixture to about 100-250 degree C. at ambient to elevated pressure to effect polymerization to form a hard, strong, thermosetting material.

The aqueous emulsion of amino lignin, amino lignin cellulose and lignin cellulose may be further reacted by heating them with a basic compound such as sodium hydroxide to form a mixture of aqueous amino lignin and basic amino lignin which is reacted with a plant protein and/or carbohydrates to form and adhesive compositions.

The amino lignin cellulose and lignin cellulose with most of the lignin removed produced by this invention is hydrolyzed to carbohydrates by acid hydrolysis using 70% sulfuric acid or 40% hydrochloric acid. The concentrated acid is add to the dried amino lignin cellulose and lignin cellulose in the ratio of 1-2 parts by weight of acid to 1 part weight of the amino lignin cellulose and lignin cellulose then heated to a low temperature of 50-70 degree C. for 1-6 hours to produce a mixture of carbohydrates, amino salt of the acid, lignin cellulose and cellulose. The cellulose and lignin cellulose that was not hydrolyzed is separated by pressing and filtering then retreated by reacting the lignin with an amino compound in an aqueous solution to produce a water soluble amino salt of lignin which is removed from the cellulose by pressing and filtering. The cellulose is then dried and retreated with the acid. The aqueous solution of carbohydrates and sulfuric acid are treated to separate the carbohydrates from the sulfuric acid by via ion exchange and then the sulfuric acid is re-concentrated via multiple effect evaporators. When hydrochloric acid is utilized the remaining solid cellulose and lignin cellulose are removed from the aqueous solution of carbohydrates and amino chloride by pressing and filtering then retreated. The carbohydrates and amino chloride is recovered by evaporating the aqueous hydrochloric acid under vacuum to depress the boiling point. The acid left in the carbohydrate and amino chloride is naturalized with calcium hydroxide. The carbohydrate may be converted into alcohol by yeast or any other suitable means.

A dilute acid hydrolysis process using sulfuric or hydrochloric acid may be utilized to hydrolyze the amino lignin cellulose and lignin cellulose with most of the lignin removed into carbohydrates. The amino lignin cellulose and lignin cellulose are soaked in 30-40% sulfuric or hydrochloric acid for 1-4 hours then water is evaporated until the acid is more concentrated up to 40 to 70% then further reacted for 1-4 hours. The carbohydrates, acid and amino salt is filter by pressing or filtering and the cellulose and lignin cellulose residue is retreated. has many uses. alcohols and other products.

Lignocellulosic-based composites are formed from small dimension pieces of cellulosic material that are bonded with an adhesive (i.e., a binder). In general, solid wood is fragmented into smaller pieces such as strands, fibers, and chips. An adhesive composition then is added to the wood component. The resulting mixture is subjected to heat and pressure resulting in a composite. The wood composite industry would greatly benefit from the development of formaldehyde-free adhesives made from renewable natural resources.

The following examples illustrate the invention. Unless otherwise designated, all constituents are designated on the basis of parts by weight.

Example 1

40 parts by weight of soft wood sawdust and 15 parts by weight of urea was added to 150 parts by weight of water then the mixture was heated to the boiling point of water at ambient pressure for 1 hour. The water had a brown color after 5 minutes of heating. The remaining aqueous urea lignin solution was pressed and filtered from the urea lignin cellulose then the urea lignin cellulose was washed with water pressed and filtered to remove more aqueous urea lignin. The urea lignin cellulose is dried, weighed and has lost 25% of the softwood's original weight.

The dark brown aqueous solution of the urea lignin is mixed and reacted with soy flour to produce an emulsion which it is then applied between two layer of wood. The two layers of wood with the thin layer of the emulsion between them is allowed to dry for 24 hours then strength tested and the tan glued join was strong. Another sample was done wherein the aqueous urea lignin was mixed with wheat flour then applied to two layer of wood, clamped and heated at 180 degree C. for 2 minutes and the clamps were remove and further heated for 15 minutes at 150 degree C. The adhesive formed a tan, hard and strong glued joint.

Example 2

20 parts by weight of guanidine was added to 80 parts by weight of fir sawdust then 250 parts by weight of water was added, mixed, after 12 hours, the dark brown guanidine lignin aqueous solution and hemi-cellulose were removed by pressing and filter from the non-soluble guanidine lignin cellulose. The guanidine lignin cellulose was dried and weighed. There was a 15% weight loss from the fir sawdust. The dried guanidine lignin was mixed and reacted with equal parts by weigh of oat flours and applied a 0.3 inch layer of the mixture between two layer of 0.25 inch thick wood panels and clamped the panels together then heated at 180 degree C. for 3 minutes. The glue strength was tested and found to be strong with good sheer strength.

Example 3

30 parts by weight of melamine and 70 parts by weight of fir sawdust was mixed in 300 parts by weight of water then boiled for 2 hour. The dark brown aqueous solution of melamine lignin and hemi-cellulose were filtered and pressed from the melamine lignin cellulose. The melamine lignin cellulose was washed then pressed and filtered to remove more of the melamine lignin. The melamine lignin cellulose was dried for further use and weighed 70% of the original fir sawdust. The aqueous solution of melamine lignin containing 20 parts by weight of melamine lignin, 20 parts by weight of corn flour and 40 parts by weight sawdust was heated while agitating until most of the water was removed then 70 parts by weight of sawdust added and mixed, the mixture was pressed into a solid mass and heated to 180 degree C. for a few minutes to effect polymerization and producing a hard, strong, light brown colored particle board.

This example was modified where in the aqueous emulsion of melamine lignin, melamine lignin cellulose and lignin cellulose was mixed and reacted with 60 parts by weight of starch then applied a 0.25" layer of this adhesive between 4 layers of 0.2" wood then apply heat and pressure to the boards for 1-3 minutes, then release the pressure and continue to heat until the adhesive is completely cures and produced a hard strong tan glue between the layer of wood to produce a plywood panel.

Example 4

About 50 parts by weight of ground palm fiber and 30 parts by weight of urea is added to 150 parts by weight of water, mixed, then soaked while agitating for about 24 hours. The aqueous solution of hemi-cellulose, urea lignin, the solid urea lignin cellulose and lignin cellulose are mixed with 30 parts by weight of soy flour (SPI), then 20 parts by weight of fir sawdust is added and mixed. The mixture is heated to remove most of the water then the mixture is pressed into a panel and heated under pressure at 150 degree C. for a few minutes to effect polymerization and produces a hard, strong, brown colored fiberboard.

Example 5

Example 4 is modified wherein the aqueous urea lignin, urea lignin cellulose, fir sawdust and soy flour with most of the water removed is spread into about a 0.25" layer between two ⅛" thick fir panels then compressed and heated to about 180 degree C. for a few minutes to effect polymerization and a strong panel is produced.

Example 6

30 parts by weight of biuret is mixed with 70 parts by weight of pine sawdust then added to 200 parts by weight of water. The mixture was heated under pressure to about 125 degree C. for about 1 hour thereby producing a mixture of hemi-cellulose biuret lignin, biuret lignin cellulose and lignin cellulose containing a lesser amount of lignin. The aqueous solution of biuret lignin was separated from the biuret lignin cellulose by pressing and filtering. Most of the water in the biuret lignin solution was removed by heating and until a paste was produced then 20 parts by weight of oat powder was added and mixed. The mixture was applied in about a 0.25" layer between two 0.25" panels then placed under pressure while heating to 180 degrees C. for 5 minutes thereby producing a strong, panel.

Example 7

Example 6 is modified wherein 10 parts by weight of an amino compound selected from the list below is added to the mixture of biuret and lignin cellulose.

| | |
|---|---|
| A) melamine | B) dicyandiamide |
| C) guanidine | D) urea borate |
| E) cyanuric acid | F) cyamelide |
| G) melamine cyanurate | H) urea melamine condensate |
| I) Urea guanidine | J) guanidine carbonate |
| K) cyanoguanidine | L) aminoguanidine |
| M) dimelamine phosphate | N) diurea phosphate |

Example 8

10 parts by weight of urea and 30 parts by weight of biomass containing lignin containing plants listed below is ground and mixed with 100 parts by weight of water then heated in an autoclave at 150 degrees C. under 100 psig of pressure for 30 minutes. The mixture was cooled, then the mixture was pressed and filtered to remove the water soluble hemi-cellulose and urea lignin from the solid urea lignin cellulose and lignin cellulose. The solid material was re-washed several time to remove more urea lignin. The urea lignin cellulose was dried. The aqueous solution of urea lignin was heated to remove water to form a paste then 10 parts by weight of soy flour was added to the paste, mixed and reacted to produce an aqueous urea lignin soy adhesive.

| | |
|---|---|
| A) fir sawdust | B) aspen sawdust |
| C) aspen thin chips | D) Pine sawdust |
| E) sycamore sawdust | F) popular thin chips |
| G) oleander granules | H) eucalyptus sawdust |
| I) caster bean stake grindings | J) cotton stalk grindings |
| K) corn stalks grindings | L) switch grass choppings |
| M) bagasse grindings | N) grass clippings |
| O) peat grindings | P) humus particles |
| Q) cardboard particles | R) bagasse wallboard particles |
| S) grape vines particles | T) rice straw grindings |
| U) wheat straw grinding | V) buck wheat straw grindings |
| W) sorghum stalks grindings | X) soybean stalk grindings |

Example 9

Example 8 is modified wherein the urea lignin cellulose and lignin cellulose with an reduced amount of lignin produced by the method of example 8 is added to 75% sulfuric acid in the ratio of 2.5 parts by weight of acid to 2 parts by weight of the urea-lignin-cellulose and heated to about 50 degree C. for 2-3 hours then add water to dilute the acid to a concentration of 25% and heat at 100 degrees C. for an hour. The carbohydrates, urea sulfate, lignin cellulose and cellulose from the reactor is pressed and filtered to recover the carbohydrate and acid. The acid and carbohydrates are separated by ionic exchange. The acid is re-concentrated via multiple effect evaporators. The remaining cellulose and lignin cellulose is retreated again with the sulfuric acid.

Example 10

Example 8 is modified wherein the urea lignin cellulose and lignin cellulose produced by the method of example 8 is added to 40% HCl in water in the ratio of 3 parts by weight of the acid to 2 parts by weight of the urea-lignin-cellulose then heated to about 60 degree C. for 3 hours. The hydrochloric acid is separated from the carbohydrates and remaining lignin cellulose and cellulose, urea salt of hydrochloric acid and lignin via vacuum distillation. The remaining cellulose and lignin is heated with aqueous urea to produce urea salt of lignin then filtered from the cellulose. The cellulose and lignin cellulose are retreated again with hydrochloric acid. The remaining HCl in the carbohydrate solution is naturalized with calcium hydroxide.

Example 11

Cardboard was cut into small pieces then wash with water and pressed to remove excess water. 20 parts by weight of cardboard and 10 parts by weight of urea was added to 70 parts by weight of water then heated to the boiling point of water for two hour. The non-water soluble amino lignin cellulose was pressed and filtered to remove the dark water soluble amino lignin. The amino lignin was dried and weighed 8 parts by weight and the dried solids, amino lignin cellulose weighed 21 parts by weight.

The amino lignin cellulose particles were dried then added to 70% sulfuric acid then heated to 60 degree C. while agitating for 3 hours. The sulfuric acid is diluted to 35% acid and soaked for 2 hours. The emulsion containing cellulose, lignin cellulose, carbohydrates and urea sulfate was pressed and filtered to remove the carbohydrates and urea sulfate. The cellulose and lignin cellulose that was not hydrolyzed is dried then re-treated with the sulfuric acid. The carbohydrate and urea sulfate is separated from the sulfuric acid via ion exchange. The sulfuric acid is re-concentrated via multiple affect evaporators for reuse.

Example 12

Example 11 is modified wherein the aqueous mixture of urea lignin and amino lignin cellulose is added to water containing starch then heating at about 100 degree C. to evaporate off the water until a thick paste was obtained then the mixture was pressed into mold and heated at 150 degree C. until polymerization was obtained thereby producing a brown, hard, strong, thermoplastic plastic.

Example 13

Example 2 is modified wherein another amino compound is used in place of guanidine and selected from the list below:

| | |
|---|---|
| a) guanidine carbonate | b) aminoguandine |
| c) cyanoguanidine | d) urea guanidine condensate |
| e) urea aminoguanidine condensate | f) urea cyanoguanidine condensate |
| g) urea dicyandiamide condensate | h) diureaphosphate with free —$NH_2$ |

Example 14

Example 2 is modified wherein the aqueous solution of guanidine lignin is heated to evaporate the water until a thick paste is produced then corn flour is added and heated up to 155 degree C. until polymerization was obtained thereby producing a thermoplastic guanidine lignin corn flour resin.

Example 15

50 parts by weight popular sawdust, 40 parts by weight of urea-guanidine condensate and 300 parts by weight of water are mixed then heated at about 100 degree C. for 2 hours while agitating. The aqueous solution of urea-guanidine lignin is filtered off from the urea guanidine lignin cellulose. The urea-guanidine lignin cellulose is washed with water to remove more urea-guanidine lignin and then filtered. The urea-guanidine lignin is concentrated by evaporating off most of the water then mixed and reacted with soy flour to produce an adhesive.

The urea-guanidine lignin cellulose and lignin cellulose are washed with 15% sulfuric acid to remove more lignin and urea-guanidine-lignin and then the aqueous lignin and urea-guanidine salt of sulfuric acid is filter off of the lignin cellulose and cellulose and reused and the lignin-cellulose and cellulose are dried. Then 40 parts by weight of 70% sulfuric acid is added to 30 parts by weight of the lignin-cellulose and cellulose and heated to 50 degree C. for 6 hours. The acid soluble carbohydrates are recovered by pressing and filtering from the un-reacted lignin-cellulose and cellulose which is recycled. The carbohydrates are separated from the sulfuric acid by ion exchange and neutralized by calcium carbonate. The sulfuric acid is re-concentrated via multiple effect evaporation and re-used.

Example 16

80 parts by weight of moist maple sawdust, 20 parts by weight urea powder and 15 parts by weight of wheat flours are mixed then a 0.25" layer of the mixture is placed between two pieces of 0.25" thick fir boards then the boards are clamped together and heated to 180 degree C. for 3 minutes to form a brown, hard and strong glue line and forming a lignin cellulose panel.

Example 17

Example 16 is modified wherein another biomass containing lignin is used in place of maple sawdust and selected from the list below:

| | |
|---|---|
| a) fir sawdust | b) oak sawdust |
| c) redwood bark | d) spruce sawdust |
| e) ash sawdust | f) birch sawdust |
| g) palm fiber powder | h) corn stalks ground fine |
| i) hemp powder | J) sugar cane stalks ground fine |

Example 18

50 parts by weight of harvest ready soybean plant with soy beans are ground into a powder and mixed with 15 parts by weight of urea powder. Water is added to moist the mixture then the mixture is placed in a 0.25" layer between 0.25" boards, clamped together then heated at 160 degree C. for 4 minutes to polymerize the mixture and produce a strong lignin cellulose panel with a light brown, hard, strong glue line.

Example 19

Example 18 is modified wherein another replaceable plant selected from the list below is used in place of the soy bean plant;

| | |
|---|---|
| a) pinto bean plant with beans, harvested and powdered | b) Butterbean plant with beans, dried and powdered |
| c) wheat plant with wheat, harvested and powdered | |
| d) oats plant and with oats, harvested and powdered | e) dry corn stalk with corn, finely ground |
| f) bagasse, dried and powdered | |
| h) maize plant with mature maize, powdered | g) rice plant with rice, dried, ground |
| | i) barley plant with mature barley |

Example 20

50 parts by weight of johnson grass powder, 12 parts by weight of urea powder and 10 parts by weight of soy flour are mixed and moistened with water, are then placed in a mold, compressed then heated to 175 degrees C. for 5 minutes to polymerize the mixture thereby producing a hard, tough molded object.

Example 21

80 parts by weight of spruce sawdust and 20 parts by weight of urea are added to 200 parts by weight of water then heated to the boiling point of the water for 2 hour, then the water containing hemi-cellulose and urea lignin is filtered off and the non-water soluble urea lignin cellulose washed with water, filtered, to remove more urea lignin. 3 parts by weight of sodium hydroxide and water are added to the urea lignin cellulose and heated at about 100 degree C. for 2 hours thereby producing water soluble sodium urea lignin and non-water soluble lignin cellulose which contains much less lignin. The aqueous sodium urea lignin filtered then is mixed with 10 parts by weight of soy flour and reacted to produce an aqueous sodium urea lignin soy flour adhesive. The aqueous sodium urea lignin soy flour adhesive is applied to the surface of two 0.25" thick boards then they are clamped together and heated to 175 degree C. for 3 minutes thereby producing a hard, brown, strong cured glue.

Example 22

Example 22 is modified wherein the sodium urea lignin and urea lignin are mixed in water then the soy flour is added, mixed and reacted thereby producing an aqueous adhesive.

Example 23

Example 21 is modified wherein another amino compound is used in place of urea and selected from the group consisting of melamine, biuret, guanidine, aminoguanidine, guanidine carbonate, cyanoguanidine and mixtures thereof.

Example 24

Example 21 is modified wherein another plant protein and/or carbohydrate is utilized in place of soy flour and selected from the group consisting of wheat flour, corn flour, barley flour, oat flour, rice flour, potato flour, starch, brown sugar and mixtures thereof.

Example 25

Example 21 is modified wherein the aqueous sodium urea lignin soy flour adhesive is applied to the surface of the boards, placed together then allow the adhesive to dry for 24 hours thereby producing a strong glued panel.

Example 26

The lignin cellulose with reduced amount of lignin as produced in example 21 is hydrolyzed into carbohydrates by the reaction of cellulase and/or by bacterial enzymes.

Example 26

Example 21 is modified wherein the aqueous emulsion containing hemi-cellulose, urea lignin, sodium urea lignin, and lignin cellulose with most of the lignin removed are mixed and reacted at ambient temperature and pressure thereby producing a adhesive emulsion. The adhesive emulsion is applied to multiple shavings of fir wood, compressed then heated to 170 degree C. for three minutes the pressure is released and heating is continued until the adhesion is cured.

I claim:

1. An adhesive composition comprising at least one amino compound reacted with at least one biomass containing a lignin component and, at least one plant protein material, wherein the adhesive is free of aldehydes and known cancer causing compounds.

2. The adhesive composition according to claim 1 wherein the biomass comprises lignin or a lignocellulose material selected from amino lignocellulose, trees, agricultural residues, wood residues, bagasses, lignin-containing waste paper and, mixtures thereof 3. The adhesive composition according to claim 1 wherein the amino comprises a compound is selected from the group consisting of urea, melamine, biuret, guanidine, aminoguanidine, guanidine carbonate, urea guanidine condensates, urea polyamine condensates, urea-melamine condensates, urea-cyandiamide, urea-aminoguanidine condensate, urea-cyanoguanidine condensate, and mixtures thereof.

4. The adhesive composition according to claim 1 wherein the amino compound comprises urea.

5. The adhesive composition according to claim 1 wherein the amino compound comprises melamine.

6. The adhesive composition according to claim 1 wherein the plant protein material comprises a protein selected from the group consisting of soy, corn, oats, wheat, barley, rice, potato and mixtures thereof.

7. The adhesive composition according to claim 1 wherein the plant protein material is a flour.

* * * * *